UNITED STATES PATENT OFFICE.

FRANK FORSTER RENWICK, OF BRENTWOOD, AND BERTRAM VINCENT STORR, OF ILFORD, ENGLAND, ASSIGNORS TO ILFORD LIMITED, OF ILFORD, ENGLAND.

PROCESS FOR THE RECOVERY OF SILVER FROM WEAK PHOTOGRAPHIC EMULSIONS.

1,234,391.     Specification of Letters Patent.     Patented July 24, 1917.

No Drawing.     Application filed October 17, 1916. Serial No. 126,222.

*To all whom it may concern:*

Be it known that we, FRANK FORSTER RENWICK and BERTRAM VINCENT STORR, subjects of the King of England, residing at Brentwood, Essex, England, and Ilford, Essex, England, respectively, have invented certain new and useful Improvements in Processes for the Recovery of Silver from Weak Photographic Emulsions, of which the following is a specification.

This invention is for improvements in or relating to processes for the recovery of silver from weak photographic emulsions, and has for its object to recover the silver from the diluted emulsions which have been thrown away heretofore, as waste, in the manufacture of photographic materials.

Means for the recovery of silver from the concentrated emulsions are already well-known, but no process other than settling has heretofore been found for recovering silver from the weak emulsions, and settling as is well-known recovers only a small proportion of the whole.

The process according to this invention for recovering silver from dilute emulsions resulting from the manufacture of photographic materials consists in forming a flocculent precipitate in the liquor by adding to the latter a reagent or reagents capable of causing the gelatinous matter to coagulate, which precipitate contains the silver so that the latter can be recovered by subsequently treating the precipitate in the same (or a similar) manner as the treatment of concentrated emulsions for the recovery of silver.

Preferably the reagent or precipitant is introduced into the liquor when the latter is "aged" either by allowing it to stand at ordinary temperatures for a day or two or by reducing the temperature of the fresh liquor below what is normal, say to 45° F., prior to introducing the precipitant.

The reagent or precipitant may be ferric chlorid or other ferric salts, or salts of aluminum (such as aluminum sulfate or common alum) or of copper, such as the sulfate. Certain other salts, *e. g.* cerium salts also will answer well, but are less convenient on account of their cost.

It has been found that the required precipitate cannot usually be formed in fresh liquor by any of these salts, but the gelatin apparently goes through some change if allowed to stand, which change, for the purpose of this specification, is merely referred to as "aging" as the exact nature of it is not understood. The same result can be quickly obtained by cooling the liquor as already described.

As an example of the proportions required in carrying out this invention, 50 gallons of dilute liquor containing, say, 15 to 18 ounces of metallic silver in the form of bromid, chlorid, etc. and ¾ to 1% or 60 to 80 ounces of gelatin, is found to require from 6 to 12 ounces of iron perchlorid solution of about 25% strength (specific gravity 1.21). It will thus be seen that a very small quantity of the precipitant is needed, though the amount necessary is found to vary according to the degree of dilution of the emulsion, larger quantities being required for the more dilute liquors.

Excess of the salt reagents seriously interferes with the settling of the precipitate, but if excess be added by inadvertence, this can be rectified by adding more of the dilute emulsion, or alternatively by adding a solution of an alkali, for example caustic soda solution, to bring about the precipitation required.

It is further found that the precipitate is more easily produced with the salts when the liquor is slightly alkaline, rather than neutral. Temperature is also found to affect the ease or otherwise with which the precipitate may be formed, for example, an "aged" liquor in which, say at 60° F. a precipitate could easily be formed, has been found to fail when its temperature was raised above 86° F. Free acid will altogether prevent precipitation with the above-mentioned salts and therefore this should be avoided, whereas if the liquor is too strongly alkaline, it leads to waste of the precipitant.

Instead of using a salt for a precipitant, any of the known gelatin coagulants may be used, and in such case the emulsion need not be previously "aged" but can be treated while fresh. For this purpose, tannic, picric, or chomic acid are suitable as reagents or precipitants for the gelatin, but it is found that considerably larger quantities of these are required than is necessary for precipitating the gelatin with the salts as previously described. If more of these acids are added than is necessary, it does not prevent the formation of the precipitate, but such excess of chemicals is wasteful.

A practical way of securing the proper quantity of precipitant is to vigorously stir the liquor while adding the precipitant, stopping at times to see whether any separation has occurred, and as soon as there is a comparatively sudden appearance of a curded precipitate floating in a clear liquor, the introduction of the precipitant should be stopped.

It will be seen that whichever of the above-mentioned precipitants is employed, and more than one may be employed if desired, such constitutes a reagent or reagents which cause the gelatin or other gelatinous matter contained in the liquor to coagulate so that it is precipitated and carries the silver down with it.

What we claim as our invention and desire to secure by Letters Patent is:—

1. In a process for recovering silver from dilute emulsions resulting from the manufacture of photographic materials, the step which consists in forming a flocculent precipitate in the liquor by adding to the latter a reagent capable of causing the gelatinous matter to coagulate, which precipitate contains the silver.

2. In a process for recovering silver from dilute emulsions resulting from the manufacture of photographic materials, the step which consists in forming a flocculent precipitate in the liquor by adding to the latter when the liquor is "aged" a reagent capable of causing the gelatinous matter to coagulate, which precipitate contains the silver.

3. In a process for recovering silver from dilute emulsions resulting from the manufacture of photographic materials, the step which consists in forming a flocculent precipitate in the liquor by adding to the latter when the liquor is "aged" by standing at ordinary temperatures for a day or two, a reagent capable of causing the gelatinous matter to coagulate, which precipitate contains the silver.

4. In a process for recovering silver from dilute emulsions resulting from the manufacture of photographic materials, the step which consists in forming a flocculent precipitate in the liquor by adding to the latter a metallic salt capable of causing the gelatinous matter to coagulate, which precipitate contains the silver.

5. In a process for recovering silver from dilute emulsions resulting from the manufacture of photographic materials, the step which consists in forming a flocculent precipitate in the liquor by adding to the latter a ferric salt capable of causing the gelatinous matter to coagulate, which precipitate contains the silver.

6. In a process for recovering silver from dilute emulsions resulting from the manufacture of photographic materials, the step which consists in forming a flocculent precipitate in the liquor by adding to the latter a ferric chlorid capable of causing the gelatinous matter to coagulate, which precipitate contains the silver.

7. In a process for recovering silver from dilute emulsions resulting from the manufacture of photographic materials, the step which consists in forming a flocculent precipitate in the liquor by adding to the latter, when the liquor is slightly alkaline, a reagent capable of causing the gelantinous matter to coagulate, which precipitate contains the silver.

8. In a process for recovering silver from dilute emulsions resulting from the manufacture of photographic materials, the steps which consist in forming a flocculent precipitate in the liquor by stirring the liquor, adding to the latter during stirring a reagent capable of causing the gelatinous matter to coagulate and simultaneously continuing the introduction of the reagent until, but not after, a flocculent precipitate floating in a clear liquid is produced which precipitate contains the silver.

In testimony whereof we have signed our names to this specification.

FRANK FORSTER RENWICK.
BERTRAM VINCENT STORR.

Copies of this patent may be obtained for five cents each, by addressing the "Commissioner of Patents, Washington, D. C."